US011879644B2

(12) United States Patent
Pasqual et al.

(10) Patent No.: US 11,879,644 B2
(45) Date of Patent: Jan. 23, 2024

(54) ELECTRIC STOVETOP HEATER UNIT WITH INTEGRATED TEMPERATURE CONTROL

(71) Applicant: Zoppas Industries de Mexico S.A., de C.V., San Luis Potosi (MX)

(72) Inventors: Maurizio Francesco Pasqual, San Luis Potosi (MX); Jose Jesus Reyes Soto, San Luis Potosi (MX); Alfredo Cuevas Morales, San Luis Potosi (MX); Pierpaolo Campeol, San Luis Potosi (MX)

(73) Assignee: Zoppas Industries de Mexico S.A., de C.V., San Luis Potosí (MX)

( * ) Notice: Subject to any disclaimer, the term of this patent is extended or adjusted under 35 U.S.C. 154(b) by 0 days.

(21) Appl. No.: 16/546,021

(22) Filed: Aug. 20, 2019

(65) Prior Publication Data

US 2020/0217517 A1 Jul. 9, 2020

Related U.S. Application Data

(63) Continuation of application No. 15/639,334, filed on Jun. 30, 2017, now Pat. No. 10,429,080, which is a (Continued)

(51) Int. Cl.
*F24C 15/10* (2006.01)
*F24C 7/08* (2006.01)

(Continued)

(52) U.S. Cl.
CPC ............ *F24C 15/105* (2013.01); *F24C 7/088* (2013.01); *H05B 1/0266* (2013.01); *H05B 3/76* (2013.01); *H05B 2213/07* (2013.01)

(58) Field of Classification Search
CPC .. F24C 15/105; F24C 7/088; F24C 7/08–083; H05B 1/0266; H05B 2213/07;

(Continued)

(56) References Cited

U.S. PATENT DOCUMENTS 2,140,479 A 12/1938 Myers et al.
2,399,423 A 4/1946 Edward (Continued)

FOREIGN PATENT DOCUMENTS

CN 1811650 A 8/2006
CN 1927102 A 3/2007

(Continued)

OTHER PUBLICATIONS

International Preliminary Report on Patentability issued in International Application No. PCT/IB18/00124, dated Sep. 6, 2019, 11 pages.

(Continued)

*Primary Examiner* — Sang Y Paik
(74) *Attorney, Agent, or Firm* — Mintz Levin Cohn Ferris Glovsky and Popeo, P.C.

(57) ABSTRACT

An apparatus includes a heater with a heating element having a region that does not contain a surface heating portion of the heating element and a thermostat positioned in the region. The thermostat includes a contact surface disposed to make physical contact with an object placed on the surface heating portion and a switch configured to prevent a current from conducting through the heating element when the contact surface experiences a temperature equal to or greater than a temperature limit.

19 Claims, 13 Drawing Sheets

Related U.S. Application Data continuation of application No. 15/438,537, filed on Feb. 21, 2017, now Pat. No. 10,429,079.

(51) Int. Cl.
*H05B 1/02* (2006.01)
*H05B 3/76* (2006.01)

(58) Field of Classification Search
CPC . H05B 3/76; H05B 3/68; H05B 3/681; H05B 3/70; H05B 3/746; H05B 3/748; H05B 2213/00; H05B 2213/03; H05B 2213/04; H05B 2213/05
USPC ............................................ 219/443.1–468.2
See application file for complete search history.

(56) References Cited

U.S. PATENT DOCUMENTS

| | | | | | |
|---|---|---|---|---|---|
| 2,678,379 | A | * | 5/1954 | Fry | H05B 1/0213 219/494 |
| 2,764,665 | A | | 9/1956 | Walkoe | |
| 2,781,038 | A | * | 2/1957 | Sherman | F24C 3/126 126/52 |
| 2,806,122 | A | | 9/1957 | Thunander | |
| 2,880,614 | A | | 4/1959 | Reiter | |
| 2,988,625 | A | | 6/1961 | Hart | |
| 2,994,758 | A | | 8/1961 | Kelly | |
| 3,041,437 | A | | 6/1962 | Carissimi | |
| 3,083,287 | A | | 3/1963 | Clapp | |
| 3,155,815 | A | | 11/1964 | Clapp | |
| 3,246,122 | A | | 4/1966 | Wetzel | |
| 3,384,736 | A | | 5/1968 | Peter | |
| 3,674,983 | A | * | 7/1972 | Hurko | F24C 15/108 219/467.1 |
| 4,051,346 | A | * | 9/1977 | Lenmark | F24H 9/1818 392/441 |
| 4,214,150 | A | | 7/1980 | Cunningham | |
| 4,241,289 | A | | 12/1980 | Bowling | |
| 4,330,701 | A | * | 5/1982 | Fischer | F24C 15/105 219/468.2 |
| 4,431,908 | A | * | 2/1984 | Fischer | H05B 3/72 219/465.1 |
| 4,812,624 | A | * | 3/1989 | Kern | F24C 15/105 219/448.14 |
| 5,294,779 | A | | 3/1994 | Miquelot | |
| 5,945,017 | A | | 8/1999 | Cheng et al. | |
| 5,951,898 | A | | 9/1999 | Bailleul et al. | |
| 6,246,033 | B1 | | 6/2001 | Shah et al. | |
| 8,723,085 | B2 | | 5/2014 | Callahan et al. | |
| 9,220,130 | B1 | | 12/2015 | Smith | |
| 9,894,716 | B2 | | 2/2018 | Mohr | |
| 10,018,514 | B2 | | 7/2018 | Jewell et al. | |
| 10,222,070 | B2 | | 3/2019 | Cadima | |
| 10,251,218 | B2 | | 4/2019 | Gomez et al. | |
| 10,429,079 | B2 | | 10/2019 | Pasqual et al. | |
| 10,429,080 | B2 | * | 10/2019 | Pasqual | H05B 1/0266 |
| 10,962,232 | B2 | | 3/2021 | Pasqual et al. | |
| 11,506,399 | B2 | | 11/2022 | Pasqual et al. | |
| 2002/0113057 | A1 | | 8/2002 | Lerner | |
| 2006/0186112 | A1 | | 8/2006 | Valiyambath et al. | |
| 2012/0125912 | A1 | | 5/2012 | Callahan et al. | |
| 2015/0233770 | A1 | | 8/2015 | Jewell et al. | |
| 2016/0316519 | A1 | | 10/2016 | Gomez et al. | |
| 2017/0325293 | A1 | | 11/2017 | Bach et al. | |
| 2017/0359861 | A1 | | 12/2017 | Smith et al. | |
| 2018/0124869 | A1 | | 5/2018 | Gomez | |
| 2018/0238557 | A1 | | 8/2018 | Pasqual et al. | |
| 2018/0238558 | A1 | | 8/2018 | Pasqual et al. | |
| 2018/0238559 | A1 | | 8/2018 | Pasqual et al. | |
| 2021/0317994 | A1 | | 10/2021 | Pasqual et al. | |
| 2021/0332983 | A1 | | 10/2021 | Pasqual et al. | |
| 2023/0160579 | A1 | | 5/2023 | Pasqual et al. | |

FOREIGN PATENT DOCUMENTS

| | | | |
|---|---|---|---|
| CN | 201190242 | Y | 2/2009 |
| CN | 104378858 | A | 2/2015 |
| DE | 3510398 | A1 | 9/1986 |
| DE | 3833293 | A1 | 4/1989 |
| DE | 29911480 | U1 | 9/1999 |
| EP | 1762161 | A1 | 3/2007 |
| EP | 2131625 | B1 | 11/2012 |
| FR | 1282084 | A | 1/1962 |
| GB | 2011769 | A | 7/1979 |
| GB | 2343352 | A | 5/2000 |
| WO | 2018154377 | A2 | 8/2018 |
| WO | 2019058169 | A1 | 3/2019 |

OTHER PUBLICATIONS

International Search Report and Written Opinion in International Application No. PCT/IB18/00124, dated Aug. 13, 2018, 16 pages.
International Search Report and Written Opinion received for PCT Application No. PCT/IB2018/01086, dated Dec. 12, 2018, 13 pages.

* cited by examiner

ELECTRIC STOVETOP HEATER UNIT WITH INTEGRATED TEMPERATURE CONTROL

CROSS-REFERENCE TO RELATED APPLICATION

This application is a continuation of application Ser. No. 15/639,334, filed Jun. 30, 2017, entitled, “Electric Stovetop Heater Unit with Integrated Temperature Control,” which is a continuation of application Ser. No. 15/438,537, filed Feb. 21, 2017, entitled, “Electric Stovetop Heater Unit with Integrated Temperature Control.” The disclosure of each document identified in this paragraph is incorporated by reference herein in its entirety.

TECHNICAL FIELD

The subject matter described herein relates to systems and methods for controlling the temperature of a heating element.

BACKGROUND

Heaters are used to provide heat to an object by converting electrical current in the heating element into thermal energy. The thermal energy is typically transferred to the object by conduction between the object and the heating element. The temperature of a heater can be varied by adjusting the amount of current flowing through the heating element until a desired thermal equilibrium is reached between the heating element and the object in thermal contact with the heating element.

SUMMARY

Systems and methods for controlling the temperature of a heating element are disclosed.

In a first aspect, an apparatus includes a heater with a heating element having a region that does not contain a surface heating portion of the heating element and a thermostat positioned in the region. The thermostat includes a contact surface disposed to make physical contact with an object placed on the surface heating portion and a switch configured to prevent a current from conducting through the heating element when the contact surface experiences a temperature equal to or greater than a temperature limit.

In some variations one or more of the following features can optionally be included in any feasible combination. A medallion can be positioned below a top surface of the heating element. The medallion can include a medallion aperture shaped to allow the contact surface to extend vertically through the medallion aperture to make physical contact with the object.

There can also be an urging element providing an upward force to cause the contact surface to make physical contact with the object. There can be an urging surface abutting a bottom surface of the thermostat and providing the upward force to the thermostat. Also, a deformable surface can be operatively connected to the urging surface and that mechanically deforms to cause an upward force in response to a downward force applied from the object to the thermostat. The deformable surface can have a number of planar sections each connected at an angle, the upward force applied through the deformable surface being a restorative force to urge the deformable surface to restore the angles between the plurality of planar sections.

The urging surface can be connected to an upper portion of the thermostat and provide the upward force to the thermostat. A deformable surface can be operatively connected to the urging surface and that mechanically deforms to cause an upward force in response to a downward force applied from the object to the temperature sensor, the deformable surface comprising a plurality of planar sections each connected at an angle, the upward force applied through the deformable surface being a restorative force to urge the deformable surface to restore the angles between the plurality of planar sections.

The urging element can include an urging surface connected to a bottom portion of the thermostat and providing the upward force to the thermostat. The deformable surface can be operatively connected to the urging surface and that mechanically deforms to cause an upward force in response to a downward force applied from the object to the temperature sensor. The deformable surface can have a radius that increases in response to the downward force causing a flattening of the deformable surface.

The contact surface of the thermostat can extend vertically approximately 0.2 mm above the medallion.

In an interrelated aspect, a method for regulating a temperature of an apparatus that includes a heater with a heating element having a region that does not contain a surface heating portion of the heating element and a thermostat positioned in the region, the thermostat including a contact surface in physical contact with an object placed on the surface heating portion and a switch configured prevent a current from conducting through the heating element when the contact surface experiences a temperature equal to or greater than a temperature limit. The method includes opening the switch to prevent the current from conducting through the heating element when the contact surface experiences the temperature that is equal to or greater than the temperature limit. When the temperature experienced by the contact surface is below the temperature limit, the switch is allowed to close such that current can conduct through the heating element.

In another interrelated aspect, a heating element is operatively connected between a first terminal in electrical contact with a second terminal to conduct a current through the heating element. A thermostat is positioned within a region of the heating element and operatively connected in series between the first terminal and the second terminal to measure a temperature of the heating element. The thermostat includes a switch configured to prevent the current from conducting through the heating element when the thermostat measures or experiences a temperature of the heating element that is equal to or greater than a temperature limit.

In some variations one or more of the following features can optionally be included in any feasible combination.

There can be an inner end heater operatively connected to conduct the current between the first terminal and an inner end of the heating element. An outer end heater can be operatively connected to conduct the current between an outer end of the heating element and the thermostat.

The connection of the heating element to the first terminal and the second terminal can be below the heating element. A protective plate can be mounted below the thermostat and covering the thermostat to prevent access to the thermostat from below the protective plate.

A medallion can be mounted in the region of the heating element and in thermal contact with the thermostat to allow thermal conduction between the medallion and the thermostat.

The switch can be further configured to allow the current to conduct through the heating element when the temperature measured by the thermostat is below the temperature limit.

The thermostat can have a vertical displacement below the heating element to cause the temperature measured by the thermostat to be almost entirely due to the temperature of the heating element. The vertical displacement can be at least one of approximately 10 mm, 25 mm, 50 mm, 75 mm, or 100 mm.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Heating elements, for example those used in stovetop burners and hot plates, can be used to heat objects or prepare food. As described herein, heating elements can provide heat to the desired object primarily by the conduction of heat from the heating element to the object placed on top of, or otherwise in contact with, the heating element. The heating element can also contribute heat to the object in the form of radiative heat transfer.

An electrical current passed through the heating element can cause resistive heating of the heating element. The direction of current flow through any of the elements described herein is arbitrary and can go in any direction consistent with the applied power source. The steady-state temperature of the heating element can be based on achievement of thermal equilibrium between the power dissipated during the resistive heating and the power radiated or conducted away by the objects or the medium in contact with the heating element. During the heating process, the temperature of the heating element increases until thermal equilibrium is reached. Because an object, for example, a pan with water, can act as a substantial heat sink, the heating element can obtain a different final temperature than it would in the absence of an object being heated.

Because the temperature of the heating element can vary substantially depending on the various heat sinks, an unmonitored or unregulated supply of current to the heating element can cause the heating element to overheat. An overheated heating element can damage an object that is unable to dissipate the heat from the heating element. Also, an overheated heating element can damage the heating element itself, through mechanical failure, melting, or enhanced degradation of the heating element, or can result in a fire or the production of unhealthy combustion or thermal degradation by-products.

By providing a direct measurement of the temperature of the heating element, an overheat condition can be detected. The current to the heating element can then be reduced or stopped in order to avoid the overheating condition. Various implementations of the current subject matter described herein address this problem.

Figure 1:
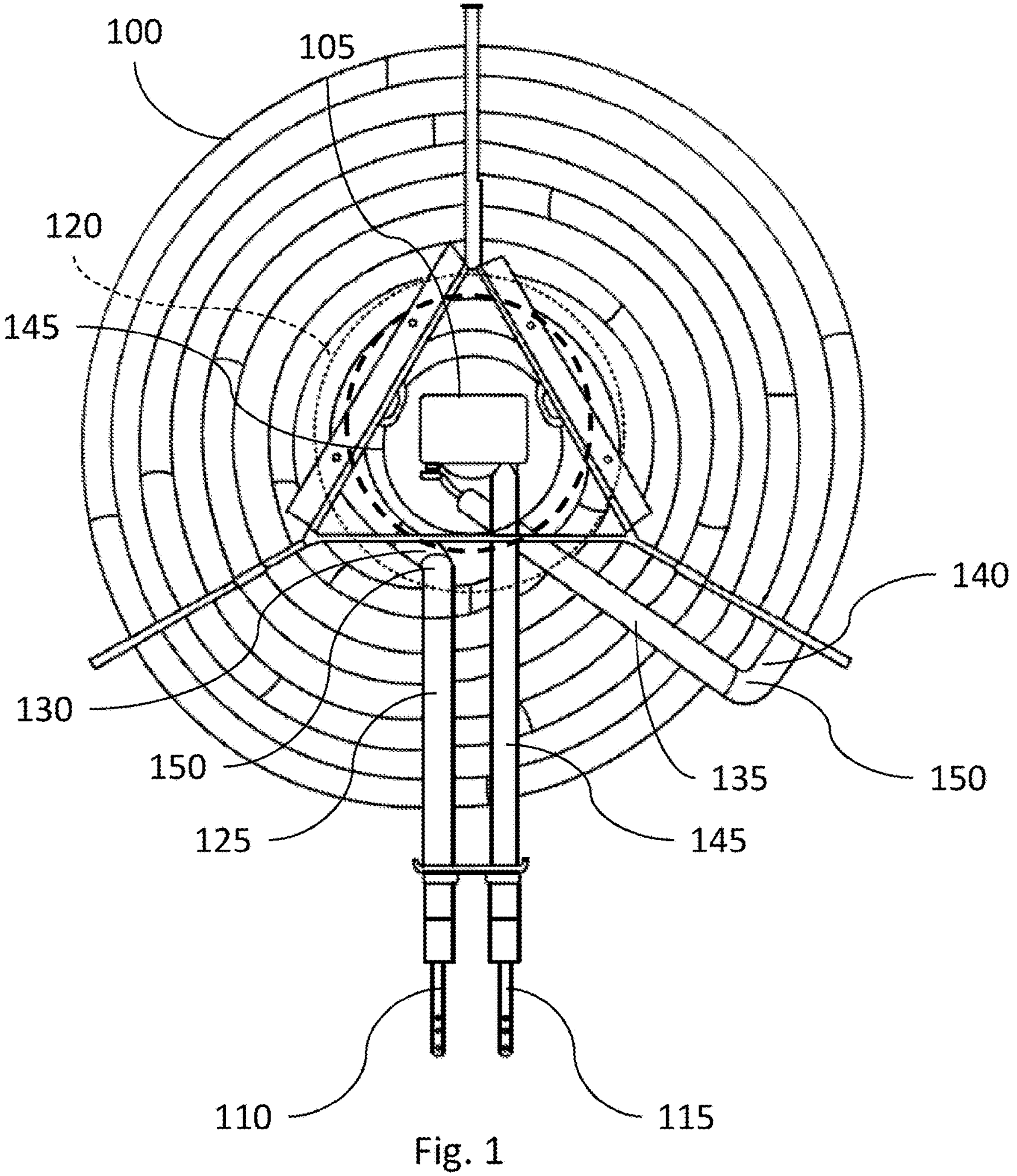
FIG. 1 is a diagram illustrating a simplified bottom view of an exemplary heating element and thermostat in accordance with certain aspects of the present disclosure.

FIG. 1 is a diagram illustrating a simplified bottom view of an exemplary heating element 100 and thermostat 105 in accordance with certain aspects of the present disclosure.

A heating element 100 can be operatively connected between a first terminal 110 in electrical contact with a second terminal 115 to conduct a current through the heating element 100. The first terminal 110 and the second terminal 115 can be connected across a voltage source or other power supply (not shown) that provides the current for the heating element 100. The heating element 100, as shown in FIG. 1, can be generally shaped in a spiral with current flowing from the first terminal 110 to a region of the heating element 100 and then spiraling outward through the heating element 100 to return through the second terminal 115. Though the implementations shown herein illustrate a spiral pattern to the heating element 100, other structural forms of the heating element 100 can be used. For example, the heating element 100 can be rectangular, grid shaped, triangular, or the like. The heating element 100 can be constructed of any electrically conducting material, for example, iron, steel, tungsten, or the like. The cross-sectional shape of the heating element 100, as shown in FIG. 1, can be circular. However, other cross-sectional shapes are possible, including rectangular, square, or the like. The heating element 100 can be shaped to provide a generally planar surface such that the object to be heated can be placed onto the heating element 100 in a generally level orientation. However, the heating element 100 can also be shaped in other ways, for example, to form a concave or convex surface, to provide an angle between two portions of the surface of the heating element 100, or the like.

In some implementations, a thermostat 105 can be positioned within a region of the heating element 100 and operatively connected in series between the first terminal 110 and the second terminal 115. The thermostat 105 can measure, regulate, or limit a temperature of the heating element 100. The thermostat 105 can include a temperature sensor that is in direct contact with the heating element 100 to provide a direct measurement of the temperature of the heating element 100. To make a direct measurement of the temperature of the heating element 100, the thermostat 105 can be thermally isolated or insulated from other heat sources such that other heat sources provide little or no contribution to the measurement by the thermostat 105. For example, when a cooler object is placed in contact with the heating element 100, the heating element 100 and the cooler object can have different temperatures. However, the isolated thermostat 105, by virtue of being in direct contact with only the heating element 100, measures the instantaneous temperature of the heating element 100 essentially independently of any heat provided by the object.

In other implementations, the thermostat 105 can measure and regulate the times or amount of current going through the heating element 100 based on a measurement of an object in contact with the thermostat 105 and resting on the heating element 100. Such implementations are described in further detail with regard to FIGS. 5-11.

The thermostat 105 can also include a switch configured to prevent current from conducting through the heating element 100 when the thermostat 105 measures a temperature of the heating element 100 that is equal to or greater than a temperature limit. Therefore, the switch can act to prevent an overheat condition in the heating element 100. When the temperature limit is reached, the thermostat 105 can cause the switch to open and break the circuit preventing current from flowing through the heating element 100. Similarly, the switch can be further configured to close and allow the current to conduct through the heating element 100 when the temperature measured by the thermostat 105 is below the temperature limit. In this way, the switch can open and close to regulate the temperature of the heating element 100 and keep the heating element 100 from attaining a temperature that exceeds the temperature limit.

The opening or closing of the switch can be controlled by a computer, for example by converting the electrical measurement signals from a temperature sensor in the thermostat 105 to a temperature and comparing this temperature to the temperature limit. Temperature sensors can include, for example, a thermocouple, thermometer, optical sensor, or the like. The computer, or other integrated circuit, can be included in the thermostat 105, or can be at an external location. In other implementations, the opening or closing of the switch can be based on a mechanical configuration of the switch responding to changes in the temperature of the heating element 100. For example, a switch in thermal contact with the heating element 100 can move, deflect, or the like due to thermal expansion or contraction of the materials in the switch. In other implementations, the switch can be located outside the thermostat 105. For example, the switch can be at the power supply for the heating element 100, elsewhere in the appliance containing the heating element 100, or the like.

In some implementations, the thermostat 105 can be positioned within a region 120 of the heating element 100. The region 120 of the heating element 100 is shown by the dashed line in FIG. 1. The region 120 is not restricted to literally the illustrated boundary. The region 120 is intended to illustrate the region of the heating element 100 generally at the center of the heating element 100 and proximate to the thermostat 105. Here, the thermostat 105 is connected to the heating element 100 at a location along the heating element 100 that is substantially closer to the second terminal 115 than to the first terminal 110.

Additional conductors (also referred to herein as heaters) can be connected between the terminals and the ends of the heating element 100. These heaters can act as extensions of the heating element 100 to allow connection with other components, for example, the terminals, thermostat 105, or the like. There can be an inner end heater 125 operatively connected to conduct the current between the first terminal 110 and an inner end 130 of the heating element 100. There can also be an outer end heater 135 operatively connected to conduct the current between an outer end 140 of the heating element 100 and the thermostat 105. The inner end 130 of the heating element 100 can be the location along the heating element 100 that is closest to the center of the heating element 100. Similarly, the outer end 140 of the heating element 100 can be located along the spiral-shaped heating element 100 that is the most radially distant from the center of the spiral-shaped heating element 100. There can also be a second outer end heater 135 connecting the thermostat 105 to the second terminal 115.

The inner end heater 125 and the outer end heater 135 can be shaped to allow connection of the heating element 100 to the first terminal 110 and the second terminal 115 below the heating element 100. As described above, the heating element 100 can form a generally planar surface. The inner end heater 125 can include a vertical portion 150 that extends below the heating element 100 to allow connection between the inner end 130 of the heating element 100 and the first terminal 110. The vertical portion 150 can be connected to a horizontal portion that extends to the first terminal 110. Similarly, the first outer end heater 135 and the second outer end heater 135 can also include one or more vertical portions and horizontal portions to connect the heating element 100, the thermostat 105, and the second terminal 115. Though described as including vertical and horizontal portions, the current subject matter contemplates any general shaping of the heating element 100, any inner end heaters 125, and any outer end heaters 135 to facilitate connection between the terminals, the thermostat 105, and the heating element 100.

In some implementations, a medallion 145 can be mounted in the region 120 of the heating element 100 and be in thermal contact with the thermostat 105. The medallion 145 can be a plate that occupies part of the region 120 of the heating element 100. The medallion 145 can be substantially coplanar with the top surface (also see FIG. 3) of the heating element 100. In other implementations, the medallion 145 can be slightly above the top surface of the heating element 100 or slightly below the top surface of the heating element 100. In some implementations, the medallion 145 can be constructed of metal, or other suitable thermally conductive material. When in thermal contact with the thermostat 105, the temperature sensor in the thermostat 105 can additionally measure the temperature of the medallion 145.

Figure 2:
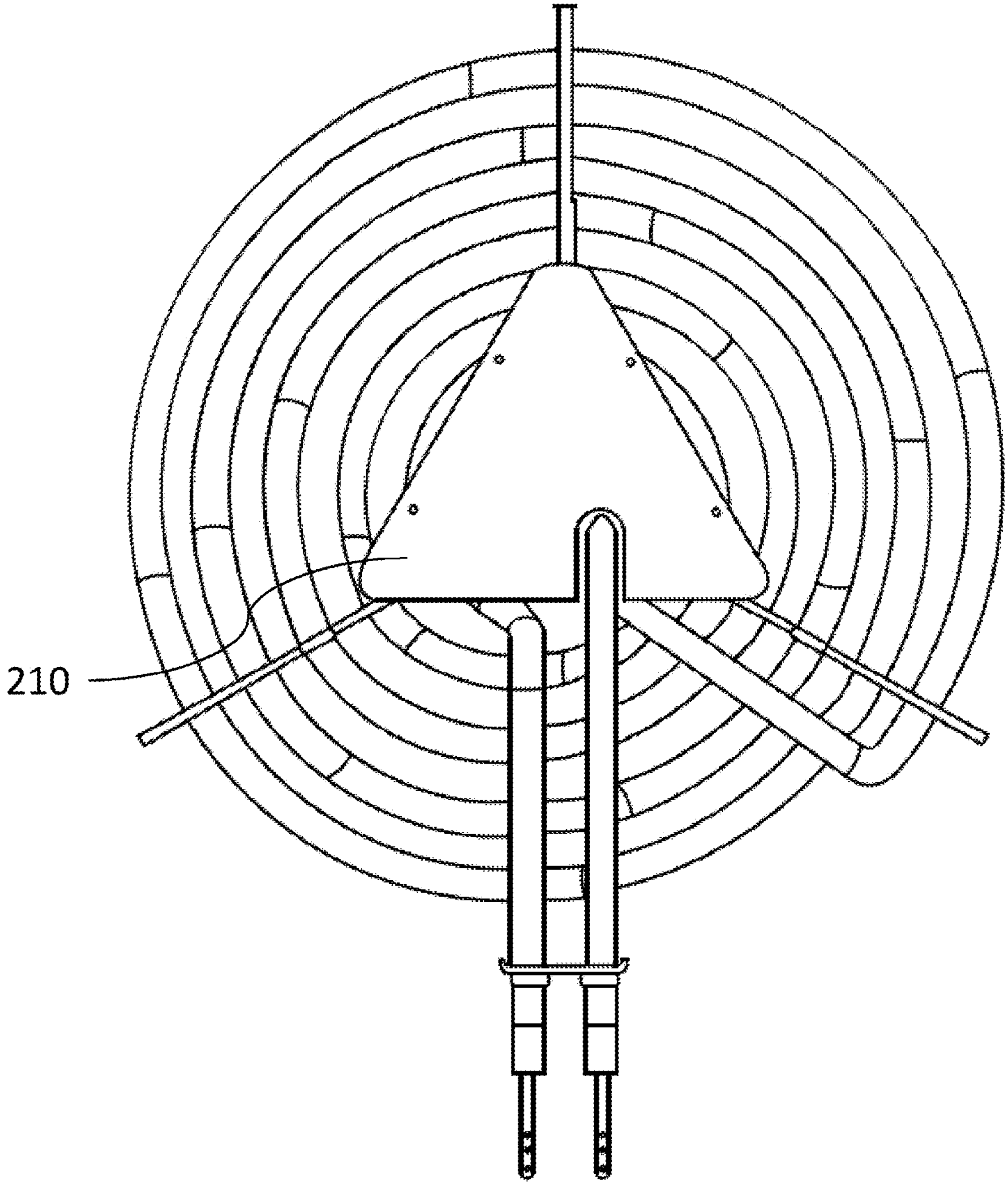
FIG. 2 is a diagram illustrating a simplified bottom view of an exemplary heating element incorporating an exemplary protective plate in accordance with certain aspects of the present disclosure.

FIG. 2 is a diagram illustrating a simplified bottom view of an exemplary heating element 100 incorporating an exemplary protective plate 210 in accordance with certain aspects of the present disclosure. As shown in FIG. 2, a protective plate 210 can be mounted below the thermostat 105 to cover the thermostat 105 and prevent access to the thermostat 105 from below the protective plate 210. In some implementations, the protective plate 210 can also extend into other parts of the region 120. The protective plate 210 can also extend beyond the region 120 to protect other portions of the heating element 100 from contact. FIG. 2 illustrates the protective plate 210 as having a generally triangular shape, however other shapes such as circular, square, or the like, are also contemplated. The protective plate 210 can have one or more slots, apertures, notches, or other removed portions that can permit access by portions of the heating element 100 or the heaters. The protective plate 210 can be spaced, insulated, or otherwise separated from the heating element 100 or the heaters to reduce or prevent any thermal or electrical conduction to the protective plate 210.

Figure 3:
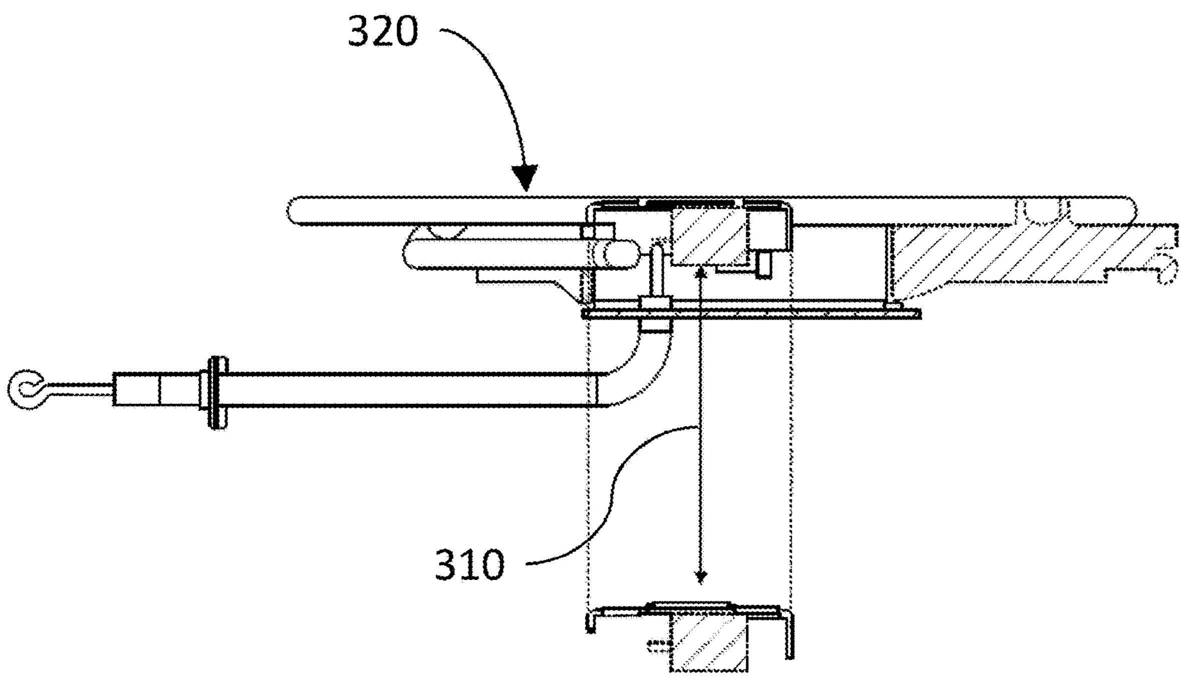
FIG. 3 is a diagram illustrating a simplified side elevational view of an exemplary thermostat displaced vertically from the heating element in accordance with certain aspects of the present disclosure.

FIG. 3 is a diagram illustrating a simplified side elevational view of an exemplary thermostat 105 displaced vertically from the heating element 100 in accordance with certain aspects of the present disclosure. In some implementations, the thermostat 105 can have a vertical displacement 310 below the heating element 100. The vertical displacement 310 can cause the temperature measured by the thermostat 105 to be almost entirely due to the temperature of the heating element 100. For example, when the thermostat 105 is in direct thermal contact with the medallion 145, which in turn is in direct contact with an object that has been heated, the thermostat 105 can read a temperature that is unreflective of the temperature of the heating element 100. However, when the thermostat 105 is displaced vertically below the heating element 100 such that the thermostat 105 is in direct contact with only the heaters or the heating element 100, and not in contact with the object on the heating element 100, the temperature measured by the thermostat 105 is more directly related to only the temperature of the components directly contacting the thermostat 105. In some implementations, when the thermostat 105 (and possibly the medallion 145) is slightly below the top surface 320 of the heating element 100, the hot object on the heating element 100 can still contribute radiative heat to the thermostat 105 (although less than the heat that would have been available via a direct conduction). In other implementations, when the thermostat 105 is further below the top surface 320 of the heating element 100, the contribution of the radiated heat from the hot object to the thermostat 105 can be reduced or effectively eliminated. The vertical displacement 310 can be, for example, approximately 10 mm, 25 mm, 50 mm, 75 mm, 100 mm, or any distance in this approximate range, as desired by one skilled in the art.

Figure 4:
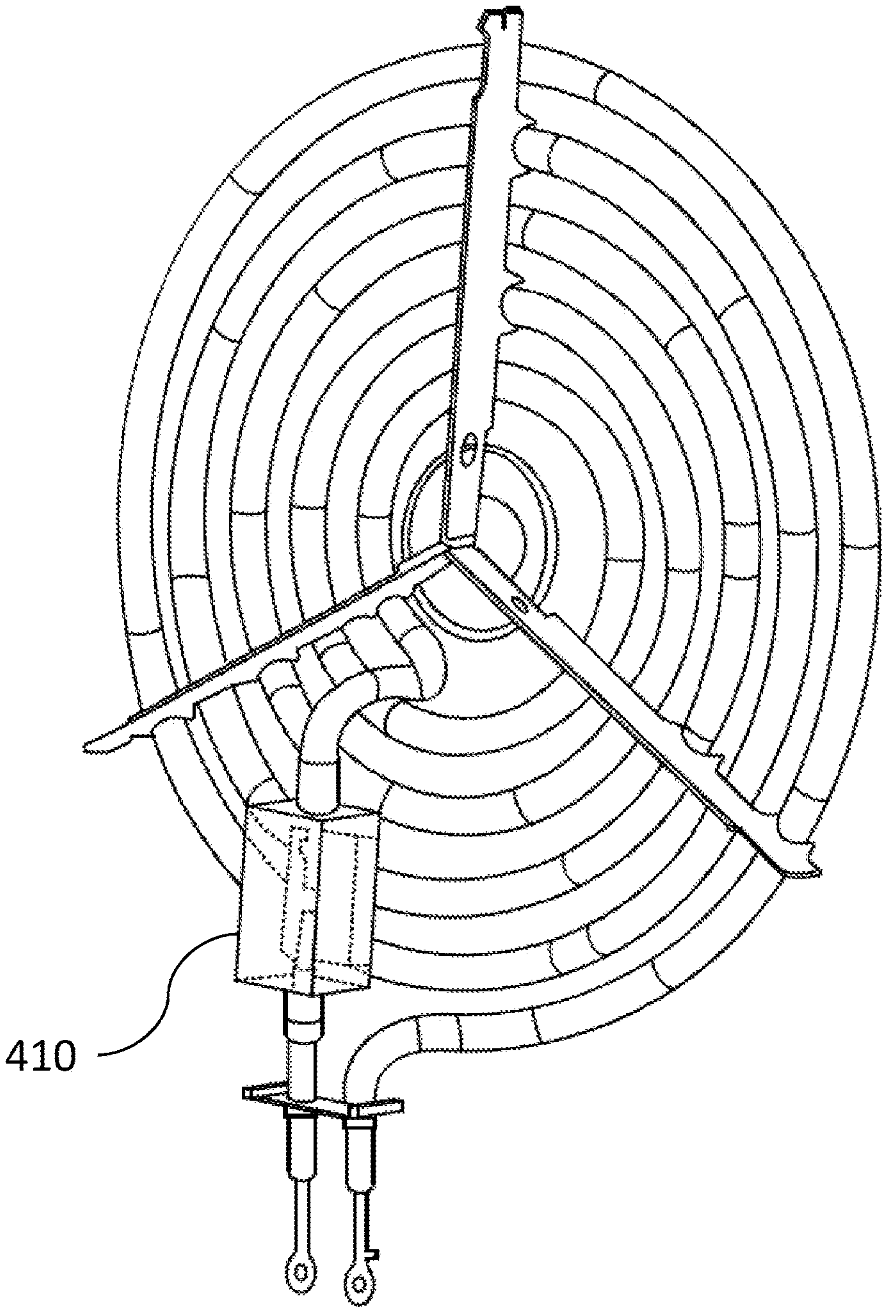
FIG. 4 is a diagram illustrating a simplified bottom view of an exemplary heating element incorporating the thermostat outside of a region of the heating element in accordance with certain aspects of the present disclosure.

In some implementations, the thermostat 105 can be positioned outside of a region 120 of the heating element 100. As described herein, the thermostat 105 can be placed in series between the first terminal 110 and the heating element 100, the second terminal 115 and the heating element 100, within the heating element 100, or generally in series with the sequence of components that form the circuit used for heating. Similar to the implementations illustrated in FIGS. 1-3, the implementation shown in FIG. 4 can also have an inner end heater 125 operatively connected to conduct the current between the thermostat 105 and an inner end 130 of the heating element 100. Here, the thermostat 105 can be an arbitrary distance from the center of the heating element 100. There can also be an outer end heater 135 operatively connected to conduct the current between an outer end 140 of the heating element 100 and the second terminal 115. Additionally, the inner end heater 125 and the outer end heater 135 can be shaped to allow connection of the heating element 100 to the first terminal 110 and the second terminal 115 below the heating element 100.

In other implementations, a capsule 410 can enclose the thermostat 105. The capsule 410 can also be electrically isolated from the thermostat 105. By enclosing the thermostat 105 in a capsule 410, the thermostat 105 can also be protected from undesirable contact. In some implementations, having the thermostat 105 electrically isolated from the capsule 410 can prevent voltage or current applied to the capsule 410 from affecting the temperature measurement. The capsule 410 can also prevent debris, scorching, oxidation, or other unwanted surface effects from adversely impacting the operation of the thermostat 105. In some implementations, the capsule 410 can be made of stainless steel, aluminum, iron, copper, or the like. Electrical isolation for the portions of the heaters, heating element 100, or terminals that are in contact with the capsule 410 can be provided by, for example, ceramic spacers or feed-throughs.

Figure 5:
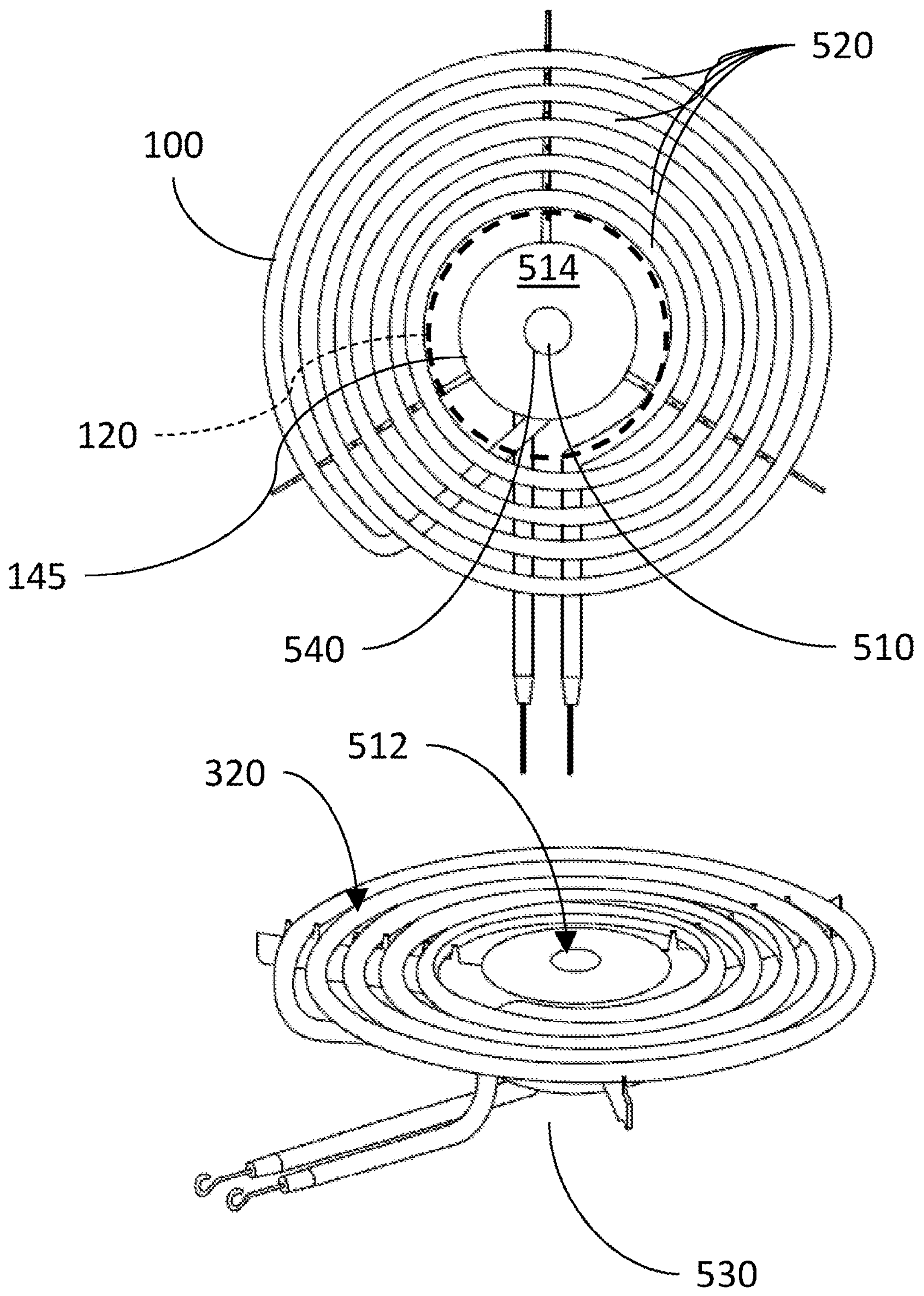
FIG. 5 is a diagram illustrating a simplified top and perspective view of a heater incorporating a contact surface extending through a medallion in accordance with certain aspects of the present disclosure.
Figure 6:
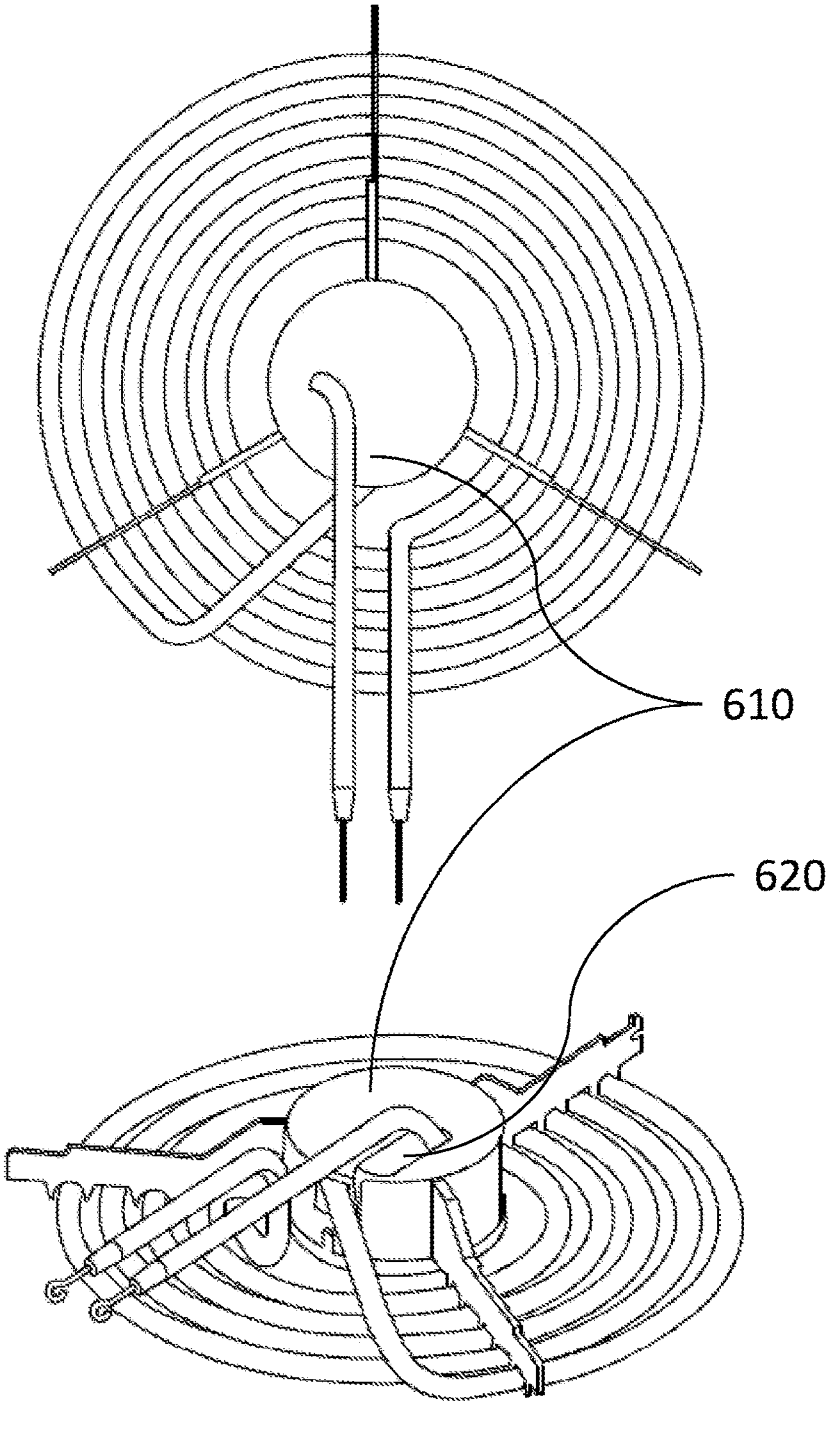
FIG. 6 is a diagram illustrating a simplified bottom and perspective view of a heater and a housing in accordance with certain aspects of the present disclosure.
Figure 7:
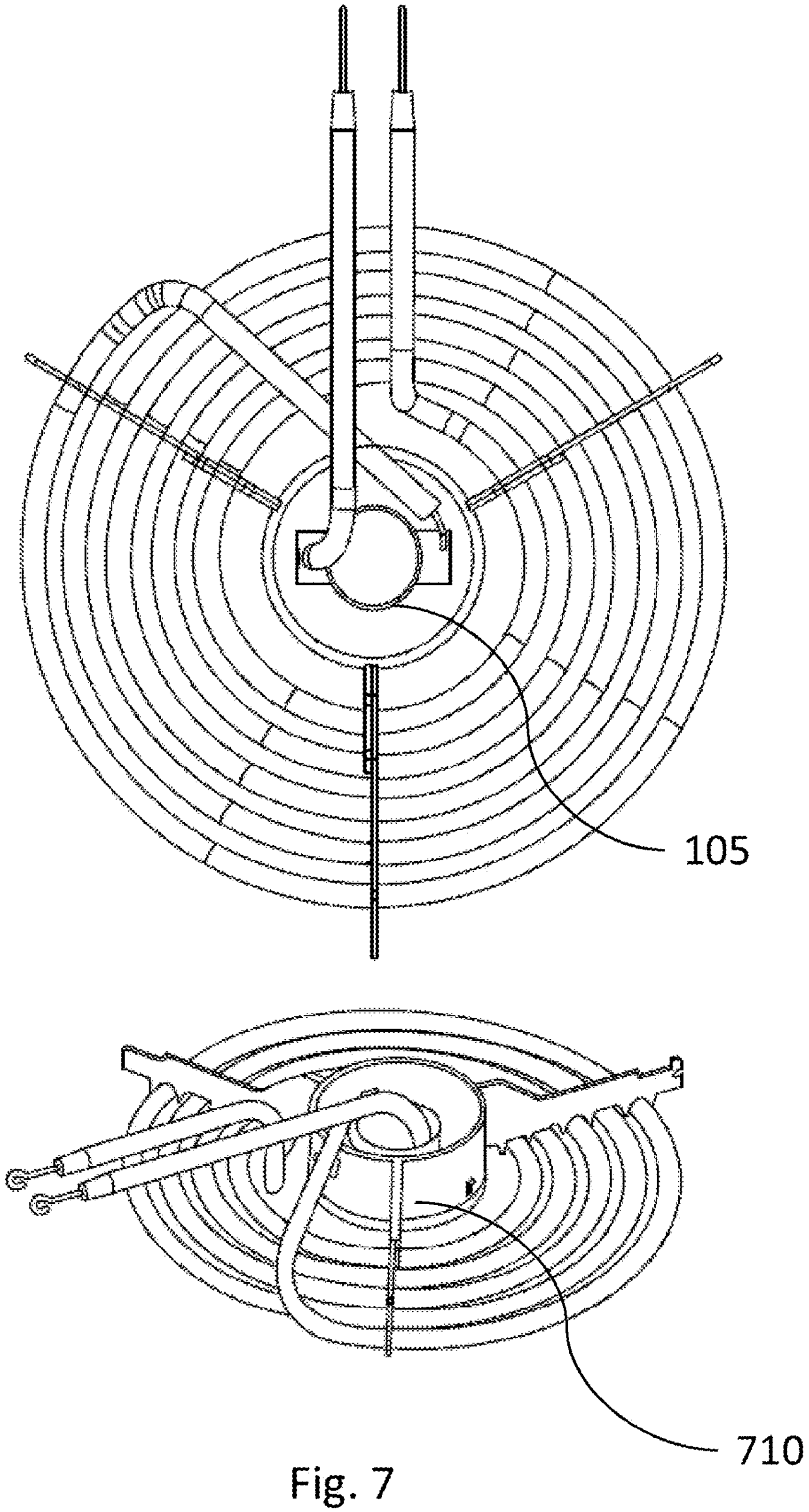
FIG. 7 is a diagram illustrating a simplified bottom and perspective view of a heater and the housing open to show the thermostat in accordance with certain aspects of the present disclosure.

FIG. 5 is a diagram illustrating a simplified top and perspective view of a heater incorporating a contact surface 512 extending through a medallion 145 in accordance with certain aspects of the present disclosure. FIG. 6 is a diagram illustrating a simplified bottom and perspective view of a heater and a housing 530 in accordance with certain aspects of the present disclosure. FIG. 7 is a diagram illustrating a simplified bottom and perspective view of a heater and the housing 530 open to show the thermostat 105 in accordance with certain aspects of the present disclosure.

As illustrated herein, for example in FIGS. 5-7, the heating element 100 can be an elongate conductor with terminals connected to a current source. The heating element 100 can be shaped to form a top surface 320 upon which an object (not shown), for example a pot, cup, or the like, can be placed for heating (this portion of the heating element 100 is also referred to herein as a surface heating portion 520). The region 120 can include an area, substantially coplanar with the top surface 320, which does not contain any portion of the heating element 100. In this way, a heater can include a heating element 100 positioned about a region 120 that does not contain a surface heating portion 520 of the heating element 100.

In some implementations, the thermostat 105 can be positioned in the region 120. As used herein, the term "region" 120 can refer to a volume above or below that indicated by the dashed line shown in FIG. 1. The region 120 generally refers to a centrally located region of the apparatus that is not used for heating, but can include other hardware. For example, the region 120 can include the thermostat 105, switches, portions of the heating element 100, electrical connections, housings, or the like.

The thermostat 105 can include a contact surface 512 that can be disposed to make physical contact with an object placed on the surface heating portion 520. In some implementations, the contact surface 512 can be the direct point of measurement for a temperature sensor 510. For example, when the temperature sensor 510 is a thermocouple, the contact surface 512 can include the joint made by the two different metal types of the thermocouple. In other implementations, the contact surface 512 can include another metal surface or similar material portion of sufficiently small thickness and thermal conductivity such that the point of measurement for the temperature sensor 510 essentially measures the same temperature as the object on the other side of the contact surface 512. For example, there can be a contact plate or other protective surface or shell surrounding the temperature sensor 510 while not interfering with the measurement of the temperature of the object by the temperature sensor 510. Similar to other implementations described herein, the thermostat 105 can include a switch configured prevent a current from conducting through the heating element 100 when the contact surface 512 measures, or otherwise experiences, a temperature equal to or greater than a temperature limit. The temperature limit can be, for example, a desired temperature of foodstuffs in a pot or object. The temperature limit can be set by a temperature setting device in communication with the switch and temperature sensor. When the temperature limit is met or exceeded, the switch can open, preventing the flow of current through the heating element 100. When the temperature is below the temperature limit, the switch can close, allowing further current flow and subsequent heating. In other implementations, the contact surface 512 reaching the temperature limit to cause the switch to open based on a physical change in the switch (e.g. a bimetallic strip or switch that opens when the temperature is experienced). In yet other implementations, the opening or closing of the switch can be based on a condition generated in response to the temperature reaching the temperature limit (e.g. a voltage generated from a thermocouple causing a switch to open or close based on the applied voltage). In further implementations, the activation of the switch can be based on analog or digital logic interpreting of measurements of the temperature of the contact surface 512 (e.g. digitizing a thermocouple output, or other measurements of the temperature).

As shown in FIG. 5, there can be a medallion 145 positioned below the top surface 320 of the surface heating element 100. The medallion 145 can include a top surface 146 that can provide support for the object. The medallion 145 can also be part of a housing 530, as shown in FIG. 6, which can hold the thermostat 105 or other hardware. In some implementations, the medallion 145 can include a medallion aperture 540 shaped to allow the contact surface 512 to extend vertically through the medallion aperture 540 to make physical contact with the object. The medallion aperture 540 can be a circular hole through the medallion 145 and can be slightly larger in diameter than the temperature sensor 510 (and possibly the corresponding contact surface 512). The shape of the medallion 145, the housing 530, and the medallion aperture 540, is arbitrary and can be, for example, circular, square, hexagonal, or the like. The housing 530 can also include one or more side walls 710 that extend from the medallion 145 to further enclose a volume inside the housing 530. Housing 530 can also include a bottom surface 610 to substantially enclose the volume inside the housing 530. The housing 530 can include one or more apertures 620 and/or feedthroughs to allow access to the interior of the housing 530. In some implementations, the apertures 620 can be shaped to correspond to the cross-sectional dimensions of the heating element 100.

In some implementations, the top surface 514 of the medallion 145 can be flush or coplanar with the top surface 320 of the heating element 100. In other implementations, the top surface 514 of the medallion 145 can be slightly above the top surface 320 or slightly below the top surface 320 of the heating element 100. For example, the distance between top surface 514 of the medallion 145 and the top surface 320 of the heating element 100 can be approximately 0 mm (i.e. coplanar), +0.2 mm, +0.4 mm, +0.6 mm, +0.8 mm, +1.0 mm, +2.0 mm, +3.0 mm, less than +5.0 mm, less than 1.0 cm, etc. Similarly, the medallion 145 distance below the top surface 320 can be, for example, approximately −0.2 mm, −0.4 mm, −0.6 mm, −0.8 mm, −1.0 mm, −2.0 mm, −3.0 mm, less than −5.0 mm, greater than −1.0 cm, etc.

To provide enhanced thermal contact with the object, the temperature sensor 510 (or equivalent contact surface 512 for the thermostat 105) can extend vertically above the top surface 320 of the medallion 145 and/or the surface heating portion 520 of the heating element 100. In some implementations, the contact surface 512 can extend vertically approximately 0.2 mm above the medallion 145. For example, a pot with a flat bottom surface can be placed on the heating element 100. Because, in this implementation, the contact surface 512 extends above the medallion 145 (and the surface heating portion 520 of the heating element 100) direct physical contact with the pot is ensured. Direct physical contact, as opposed to providing an air gap, can improve the accuracy of the temperature measurement and the response times for detection of changes in the temperature of the object. However, in other implementations, an air gap can be incorporated to provide other benefits.

Figure 8:
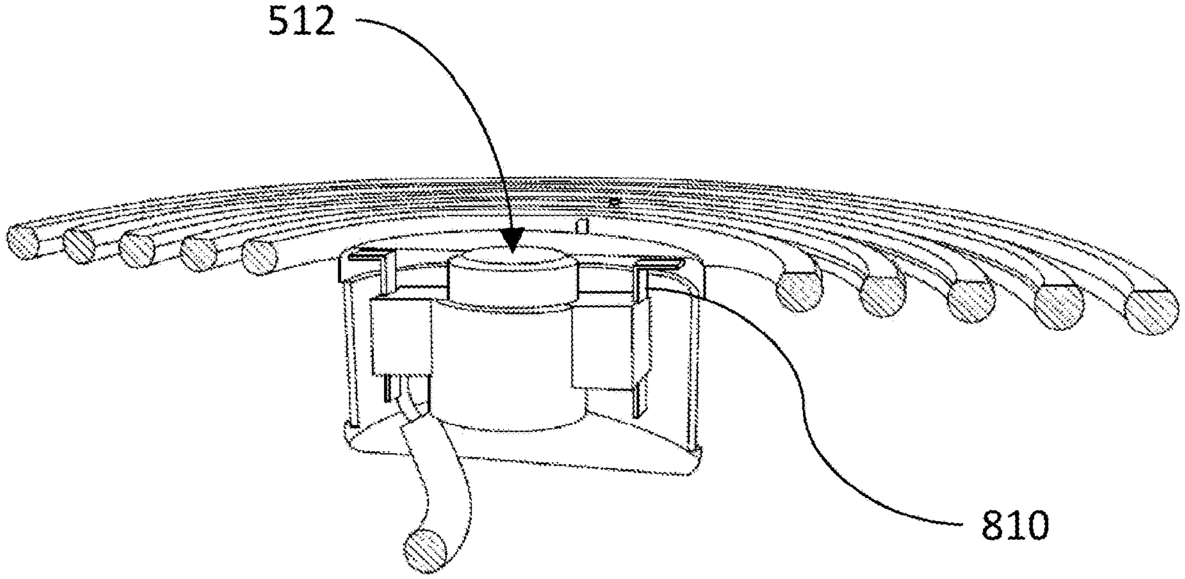
FIG. 8 is a diagram illustrating a simplified sectional view of a heater and the housing open to show the thermostat in accordance with certain aspects of the present disclosure.

FIG. 8 is a diagram illustrating a simplified sectional view of a heater and the housing 530 open to show the thermostat 105 in accordance with certain aspects of the present disclosure. In some implementations, the contact surface 512 of the temperature sensor 510 can be fixed in any of the vertical positions described herein. For example, the contact surface 512 can be slightly higher than the surface heating portion 520 of the heating element 100. In these implementations, the distance which the contact surface 512 extends vertically from the surface heating portion 520 can be small to avoid the object resting on an undesirably unstable surface. For example, the fixed distance between the contact surface 512 and the top surface 320 of the medallion 145 or the surface heating portion 520 can be approximately +0.2 mm, +0.4 mm, +0.6 mm, +0.8 mm, +1.0 mm, +2.0 mm, +3.0 mm, less than +5.0 mm, less than 1.0 cm, or the like. In other implementations, described below, there can be a means for flexibly allowing the contact surface 512 to remain in contact with the object without creating an unstable surface. The thermostat 105 can be supported in the fixed position by one or more brackets 810 connected to the medallion 145, the housing 530, or the like.

Figure 9:
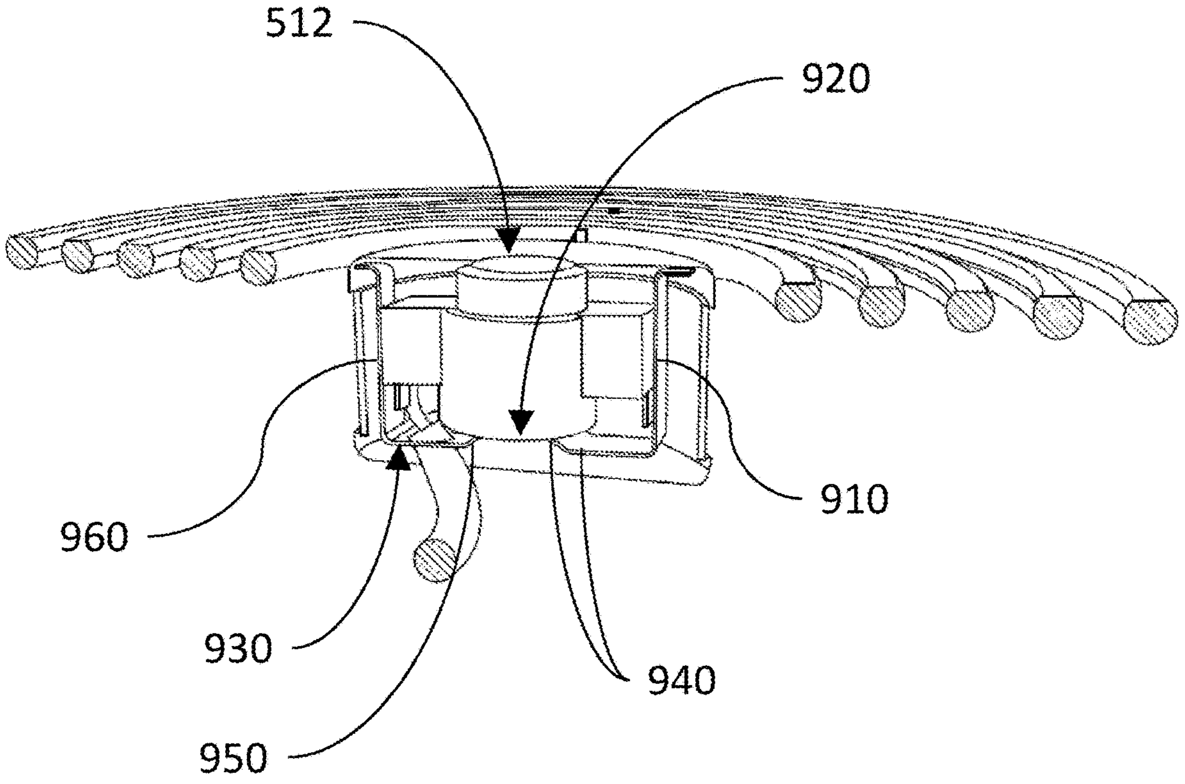
FIG. 9 is a diagram illustrating a simplified sectional view of a heater and the housing open to show the thermostat and a first implementation of an urging element in accordance with certain aspects of the present disclosure.

FIG. 9 is a diagram illustrating a simplified sectional view of a heater and the housing 530 open to show the thermostat 105 and a first implementation of an urging element 910 in accordance with certain aspects of the present disclosure. To provide good physical contact between the contact surface 512 of the thermostat 105 and the object, there can be a means for providing an upward force to the thermostat 105 to keep the contact surface 512 pressed against the object. The upward force can be provided by an urging element 910, such as a spring or other mechanism (e.g. a flexible piece of metal or other material bent or otherwise formed to undergo an elastic deflection when the contact surface 312 of the thermostat 105 is pressed down). The urging element 910 can have an urging surface 920 to press the contact surface 512 of the thermostat 105 against the object but allow the object to depress the contact surface 512 such that the object is able to rest on the stable surface heating portion 520 of the heating element 100. As shown in FIG. 9, there can be an urging surface 920 abutting a bottom surface of the thermostat 105 and providing the upward force to the thermostat 105. In some implementations, the urging element 910 can be, for example, a spring, tension bar, gas-filled piston that compresses and collapses in response to an applied weight and/or responsive to changes in temperature of the gas, or the like. In the implementations described below, the urging element 910 can generally be a mechanically deformable plate that provides an upward force to the thermostat 105.

To allow for the depression and expansion of the urging element 910, there can be a deformable surface 930 operatively connected to the urging surface 920 that mechanically deforms to cause an upward force to the thermostat 105 or (directly or indirectly) to the contact surface 512 in response to a downward force applied from the object to the temperature sensor 510. The deformable surface 930 can include a number of planar sections 940 each connected at an angle. The upward force applied through the deformable surface 930 can act as a restorative force to urge the deformable surface 930 to restore the angles between the planar sections 940.

In the implementation shown in FIG. 9, the thermostat 105 (having contact surface 512) is supported by an angled surface 950 vertically extending from a base plate. Also vertically extending from the base plate can be one or more vertical sides 960 that can be connected to the housing 530. In this way, the urging element 910 is generally shaped like a “W,” where the middle portion of the “W” is depressed when an object is placed on the contact surface 512. There can be any number of planar surfaces at various angles to provide the upward force. For example, the urging element 910 can generally be linear (e.g. a relatively narrow bent strip of thin material), cylindrical (e.g. having the cross-section shown but symmetrically formed around a central axis going through the contact surface 512), square (e.g. similar to the cylindrical case when the central area and or thermostat 105 is square), or the like, such that the general cross-section and construction of the urging element 910 remain similar to that shown in FIG. 9.

When an object is placed on the contact surface 512 of the thermostat 105, the weight of the object can cause the thermostat 105 to be pressed down until the object is resting on the heating element 100. Because the planner sections are able to mechanically deform, for example bulging downward and/or laterally, there is a restorative force pressing upwards against the thermostat 105 to maintain good physical and thermal contact with the object.

Figure 10:
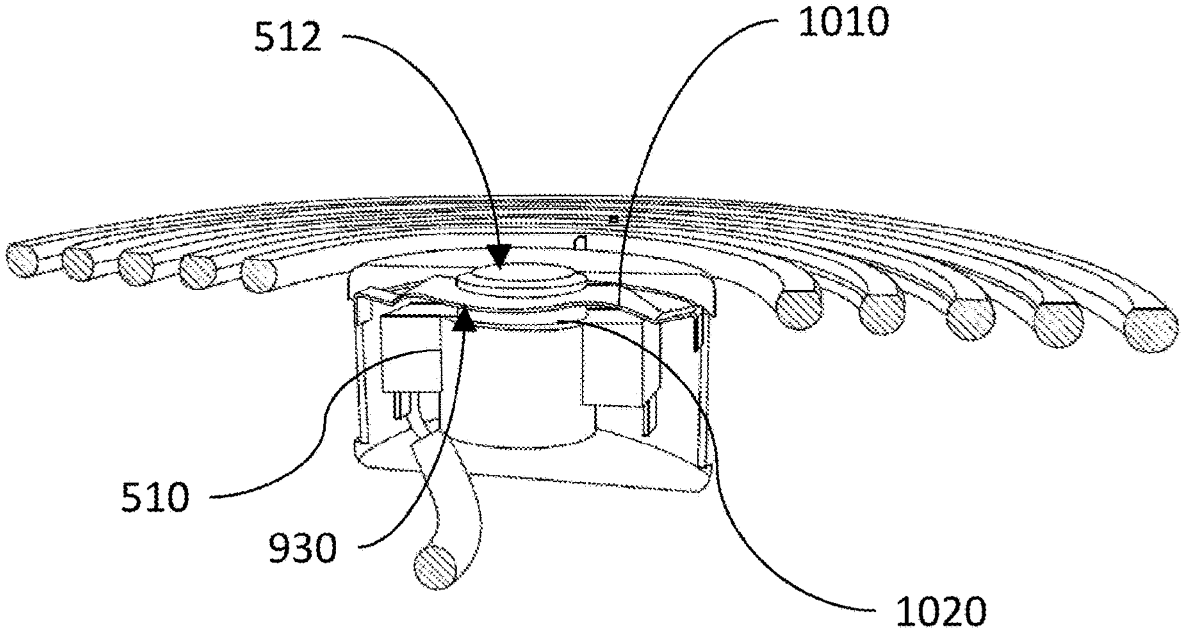
FIG. 10 is a diagram illustrating a simplified sectional view of a heater and the housing open to show the thermostat and a second implementation of an urging element in accordance with certain aspects of the present disclosure.

FIG. 10 is a diagram illustrating a simplified sectional view of a heater and the housing 530 open to show the thermostat 105 and a second implementation of an urging element 1010 in accordance with certain aspects of the present disclosure. In other implementations, the urging surface 920 of an urging element 1010 can be connected to an upper portion 1020 of the thermostat 105 and provide the upward force to the temperature sensor 510. The urging surface 920 can be connected to any part of the thermostat 105 or associated elements such that the urging element 1010 is able to cause the contact surface 512 to press against an object resting on the heating element 100. In the implementation shown in FIG. 10, the upward force provided by the urging element 1010 can be more of an upward pull to bring the contact surface 512 into contact with the object.

Figure 11:
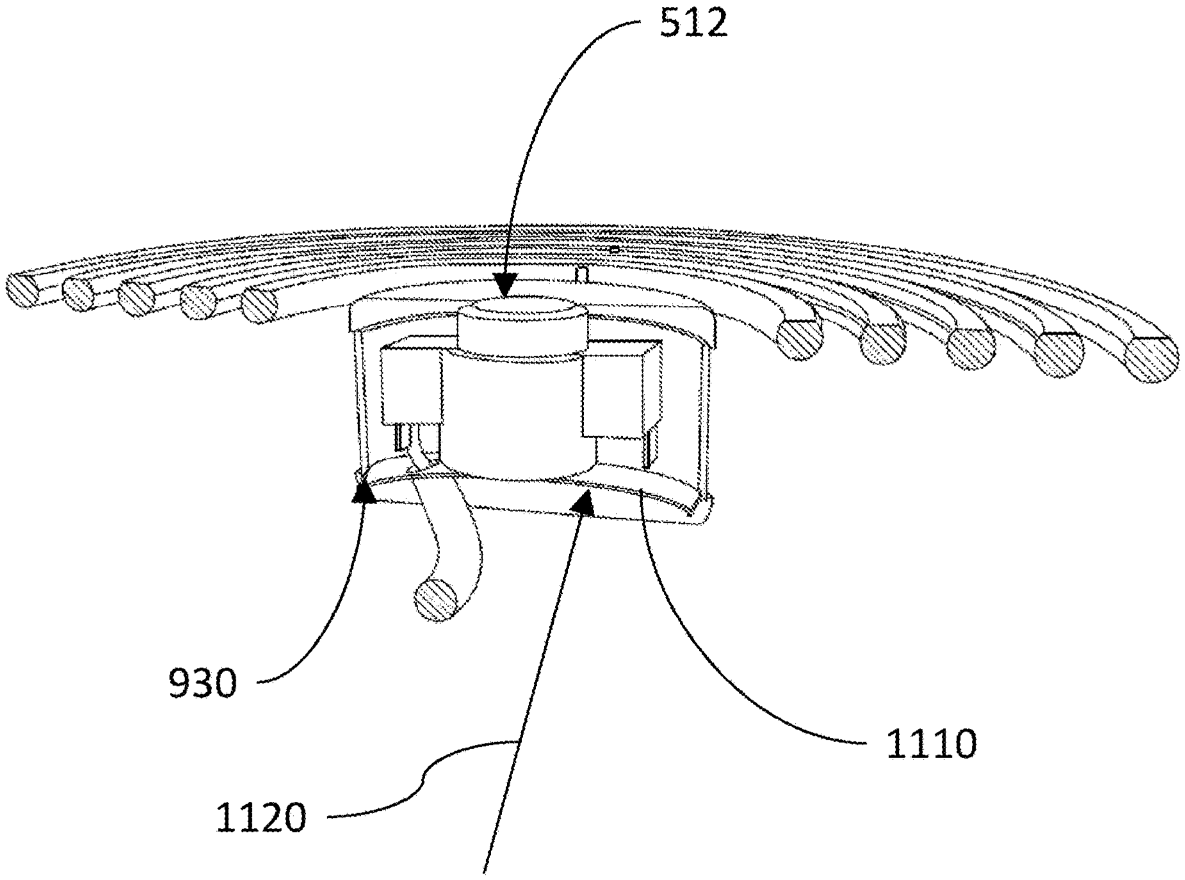
FIG. 11 is a diagram illustrating a simplified sectional view of a heater and the housing open to show the thermostat and a third implementation of an urging element in accordance with certain aspects of the present disclosure.

FIG. 11 is a diagram illustrating a simplified sectional view of a heater and the housing 530 open to show the thermostat 105 and a third implementation of an urging element 1110 in accordance with certain aspects of the present disclosure. In this implementation, the urging element 1110 can include a curved, deformable surface 930 having a radius 1120 that increases in response to the downward force flattening the deformable surface 930. Similar to the other implementations provided herein, the mechanical deformation of the curved surface 930 can provide a restoring force to press the contact surface 512 against the object. In some implementations, the radius 1120 can be defined by a specified height of the curved surface 930 above the perimeter of the curved surface 930. For example, the height can be approximately 0.5 cm, 0.75 cm, 1.0 cm, 1.5 cm, less than 2.0 cm, less than 5.0 cm, or the like. The mechanical deformation present in the curved surface 930 can be as a result of the perimeter or can also be the result of a compression of the material of the curved surface 930 in the generally lateral direction (e.g. horizontally).

Figure 12:
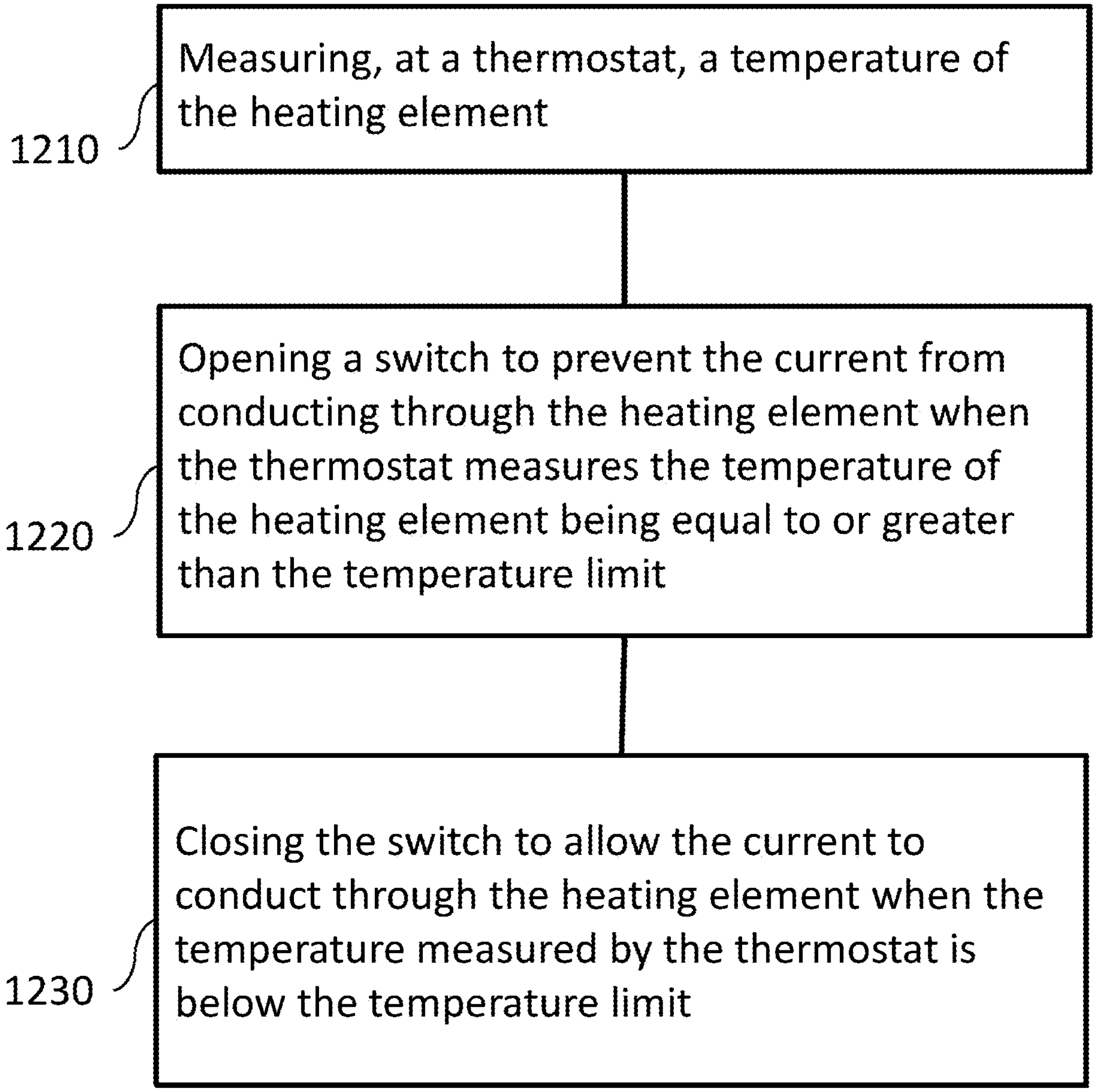
FIG. 12 is a simplified diagram for an exemplary method of controlling the temperature of the heating element in accordance with certain aspects of the present disclosure.

FIG. 12 is a simplified diagram for an exemplary method of controlling the temperature in the heating element 100 in accordance with certain aspects of the present disclosure. In some implementations, the method can include, at 1210, measuring, at the thermostat 105, the temperature of the heating element 100.

At 1220, a switch can be opened to prevent the current from conducting through the heating element 100 when the thermostat 105 measures the temperature of the heating element 100 that is equal to or greater than the temperature limit.

At 1230, the switch can be closed to allow the current to conduct through the heating element 100 when the temperature measured by the thermostat 105 is below the temperature limit.

Figure 13:
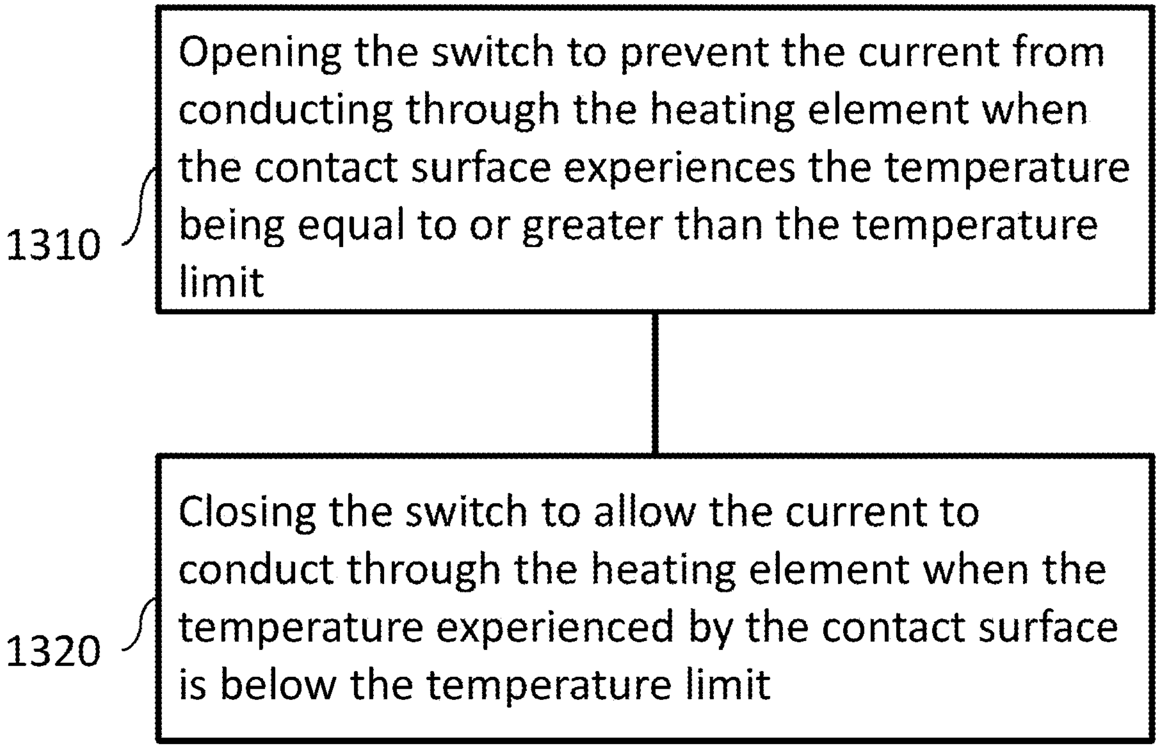
FIG. 13 is a simplified diagram for an exemplary method of controlling the temperature of an object in contact with the contact surface 512 in accordance with certain aspects of the present disclosure.

FIG. 13 is a simplified diagram for an exemplary method of controlling the temperature of an object in contact with the contact surface 512 in accordance with certain aspects of the present disclosure.

At 1310, the switch can be opened to prevent the current from conducting through the heating element 100 when the contact surface 512 experiences the temperature that is equal to or greater than the temperature limit.

At 1320, the switch can be closed to allow the current to conduct through the heating element 100 when the temperature experienced by the contact surface 512 is below the temperature limit.

In the descriptions above and in the claims, phrases such as “at least one of” or “one or more of” may occur followed by a conjunctive list of elements or features. The term “and/or” may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases “at least one of A and B;” “one or more of A and B;” and “A and/or B” are each intended to mean “A alone, B alone, or A and B together.” A similar interpretation is also intended for lists including three or more items. For example, the phrases “at least one of A, B, and C;” “one or more of A, B, and C;” and “A, B, and/or C” are each intended to mean “A alone, B alone, C alone, A and B together, A and C together, B and C together, or A and B and C together.” Use of the term “based on,”

above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Specifically, and by way of example, although the headings refer to a "Technical Field," such claims should not be limited by the language chosen under this heading to describe the so-called technical field. Further, the description of a technology in the "Background" is not to be construed as an admission that technology is prior art to any invention(s) in this disclosure. Neither is the "Summary" to be considered as a characterization of the invention (s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. An apparatus, comprising:

a heating element;

a contact surface;

a switch coupled to the contact surface, the switch configured to prevent a current from conducting through the heating element when the contact surface experiences a temperature equal to or greater than a temperature limit;

an urging element providing an upward force to cause the contact surface to contact an object placed on the apparatus, the urging element comprising:

an urging portion coupled to the switch and providing the upward force; and a deformable portion operatively connected to the urging portion and that mechanically deforms to cause the upward force in response to a downward force applied from the object to the contact surface, the deformable portion comprising at least one planar section, the upward force applied through the deformable portion being a restorative force; and a housing configured to enclose an interior volume in which at least a portion of the switch and the urging element are positioned, the housing comprising: an open end; and at least one sidewall surrounding the interior volume and extending from the open end, wherein the at least one sidewall includes in inwardly facing surface facing the interior volume, wherein the inwardly facing surface extends in a direction perpendicular to the open end from the open end to a second end opposite the open end, and wherein the inwardly facing surface is perpendicular to the second end;

wherein the at least one planar section comprises a first planar section including an outwardly facing surface in contact with and coupled to the inwardly facing surface of the at least one sidewall; and wherein the first planar section extends in the direction perpendicular to the open end.

2. The apparatus of claim 1, wherein the heating element comprises a region that does not contain a heated portion of the heating element.

3. The apparatus of claim 2, wherein the contact surface is positioned in the region.

4. The apparatus of claim 1, further comprising:

a surface heating portion;

a first portion of the heating element coupled to a first end of the switch; and a second portion of the heating element extending across the surface heating portion and coupled to a second end of the switch.

5. The apparatus of claim 4, wherein the first end of the heating element comprises a location along the heating element that is closest to a center of the heating element.

6. The apparatus of claim 1, further comprising: a medallion positioned below a top surface of the heating element, the medallion comprising a medallion aperture shaped to allow at least a portion of the switch to extend vertically through the medallion aperture to make physical contact with the object.

7. The apparatus of claim 1, wherein the deformable portion comprises a radius that increases in response to the downward force causing a flattening of the deformable portion.

8. The apparatus of claim 1, wherein the heating element is operatively connected between a first terminal in electrical contact with a second terminal to conduct the current through the heating element, and wherein the switch is operatively connected in series between the first terminal and the second terminal.

9. The apparatus of claim 8, further comprising:

an inner end heater operatively connected to conduct the current between the first terminal and an inner end of the heating element; and an outer end heater operatively connected to conduct the current between an outer end of the heating element and the switch.

10. The apparatus of claim 8, wherein the connection of the heating element to the first terminal and the second terminal is below the heating element.

11. The apparatus of claim 8, wherein the heating element comprises a first vertical portion that extends below a surface heating portion of the heating element to allow connection between a first end of the heating element and the first terminal.

12. The apparatus of claim 11, wherein the heating element comprises a second vertical portion that extends below the surface heating portion to allow connection between a second end of the heating element and a first end of the switch.

13. The apparatus of claim 1, wherein the at least one planar section comprises a plurality of planar sections each connected at an angle, and wherein the restorative force urges the deformable portion to restore the angles between the plurality of planar sections.

14. The apparatus of claim 1, further comprising a protective plate mounted below the switch and covering the switch to prevent access to the switch from below the protective plate.

15. The apparatus of claim 1, wherein the contact surface has a vertical displacement below the heating element.

16. The apparatus of claim 15, wherein the vertical displacement is at least one of approximately 10 mm, 25 mm, 50 mm, 75 mm, or 100 mm.

17. The apparatus of claim 1, further comprising: a capsule enclosing the switch, the capsule electrically isolated from the switch.

18. A method for regulating a temperature of the apparatus of claim 1, comprising:

preventing the current from conducting through the heating element when the contact surface experiences the temperature that is equal to or greater than a temperature limit; and allowing the current to conduct through the heating element when the temperature experienced by the contact surface is below the temperature limit.

19. An apparatus, comprising:

a heating element;

a contact plate;

a switch coupled to the contact plate, the switch configured to prevent a current from conducting through the heating element when the contact plate experiences a temperature equal to or greater than a temperature limit;

an urging element providing an upward force to cause the contact plate to contact an object placed on the apparatus, the contact plate configured to be positioned between the switch and the object when the object is placed on the apparatus, the contact plate comprising a thermally conductive material, the urging element comprising:

an urging portion coupled to the switch and providing the upward force; and a deformable surface operatively connected to the urging portion and that mechanically deforms to cause the upward force in response to a downward force applied from the object to the contact plate, the deformable surface comprising a plurality of planar sections connected at an angle, the upward force applied through the deformable surface being a restorative force to urge the deformable surface to restore the angles between the plurality of planar sections; and a housing configured to enclose an interior volume in which at least a portion of the switch and the urging element are positioned, the housing comprising: an open end; and at least one sidewall surrounding the interior volume and extending from the open end, wherein the at least one sidewall includes in inwardly facing surface facing the interior volume, wherein the inwardly facing surface extends in a direction perpendicular to the open end from the open end to a second end opposite the open end, and wherein the inwardly facing surface is perpendicular to the second end;

wherein at least one planar section of the plurality of planar sections includes an outwardly facing surface in contact with and coupled to the inwardly facing surface of the at least one sidewall; and wherein the at least one planar section extends in the direction perpendicular to the open end.

* * * * *